Sept. 29, 1959 E. O. WHEATON 2,906,650
METHOD OF CLEANING PIPE LINES
Filed Oct. 31, 1956 3 Sheets-Sheet 1
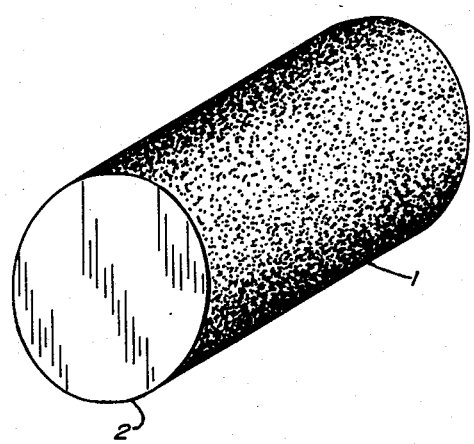
Fig. I
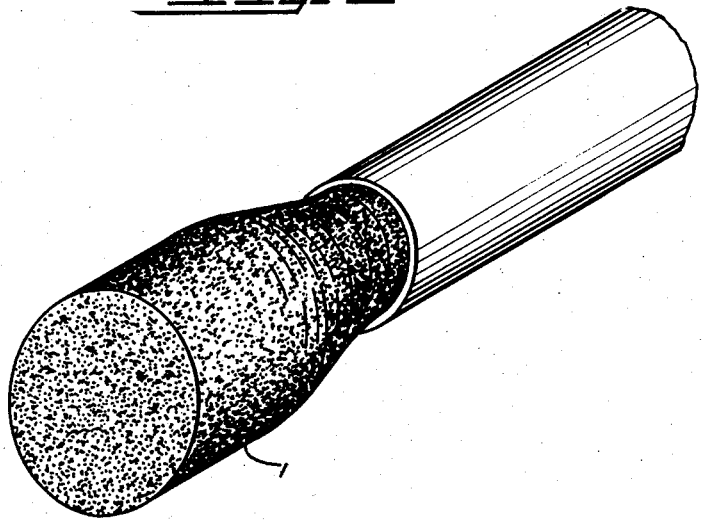
Fig. II
INVENTOR.
ESTEL O. WHEATON
BY
Marshall, Marshall & Yeasting
ATTORNEYS Sept. 29, 1959        E. O. WHEATON        2,906,650
METHOD OF CLEANING PIPE LINES
Filed Oct. 31, 1956        3 Sheets-Sheet 2
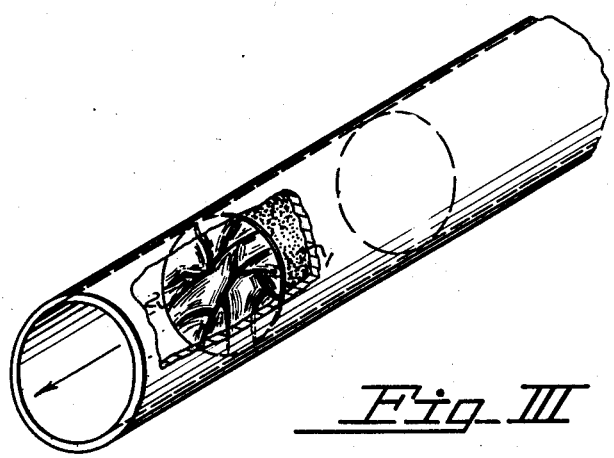
Fig. III
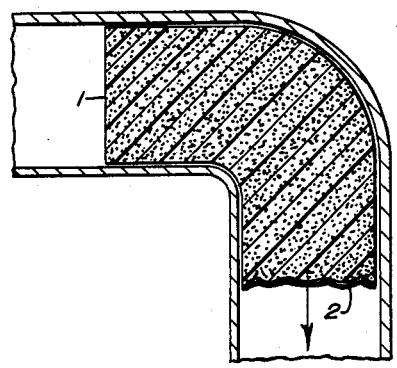
Fig. IV
INVENTOR.
ESTEL O. WHEATON
BY
Marshall, Marshall & Yeasting
ATTORNEYS Sept. 29, 1959 E. O. WHEATON 2,906,650
METHOD OF CLEANING PIPE LINES
Filed Oct. 31, 1956 3 Sheets-Sheet 3
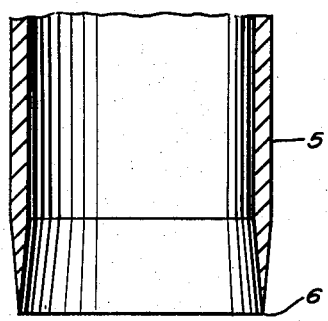
_Fig_ V
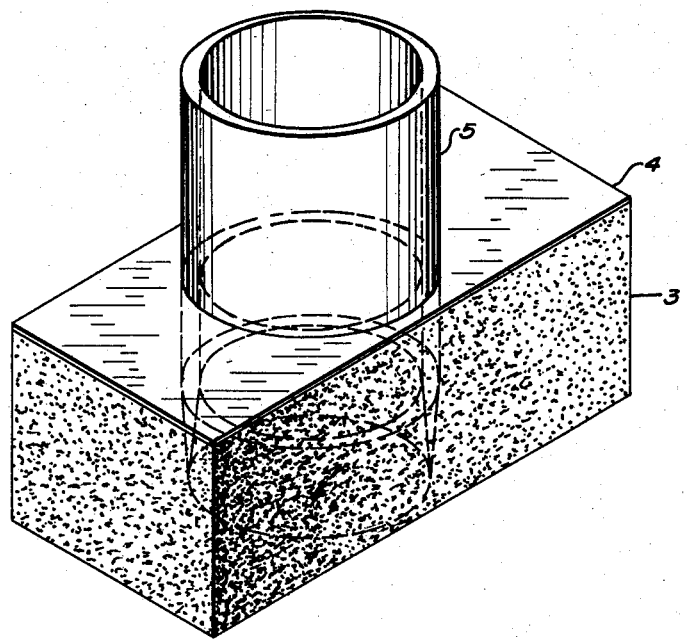
_Fig_ VI
INVENTOR.
ESTEL O. WHEATON
BY
*Marshall, Marshall & Gearsting*
ATTORNEYS United States Patent Office 2,906,650
Patented Sept. 29, 1959

2,906,650
METHOD OF CLEANING PIPE LINES

Estel O. Wheaton, Toledo, Ohio, assignor to Roll Dippers, Inc., Maumee, Ohio, a corporation of Ohio Application October 31, 1956, Serial No. 619,600

3 Claims. (Cl. 134—8)

This invention relates to methods of cleaning pipe lines and more particularly to the utilization of pipe line cleaners of the nature of swabs which are pushed or drawn through the pipe lines to be cleaned.

One object of this invention is to facilitate the cleaning of pipe lines.

Another object of the invention is to propel a pipe line cleaner of the swab type through a pipe line by fluid pressure.

Another object of the invention is to clean a pipe line having an interior which varies in size and contour with a cleaner which will expand and yield to fit itself to the variations as it is propelled through the pipe line.

Another object is to clean a pipe line throughout its length by causing the cleaner to travel around bends and through elbows, T's, valves and other fittings.

Another object is to clean pipe lines of various inside diameters with a single technique and apparatus.

Another object is to scour and polish a pipe line interior as a cleaner is passed through the line by employing a cleaner of the type having an exterior brush-like surface which, while making a substantially fluid tight seal with the interior of the piping, consists of a nap of resilient bristle-like tips.

Another object is to clean a pipe line by driving a cleaner through the line under fluid pressure in a manner which prevents the cleaner from wadding into an obstruction that could clog the line.

Another object is to clean a pipe line with a cleaner which is porous and capable of taking up water but is resistant to wetting and does not swell in water.

And still another object is to clean a pipe line without contaminating it with material carried in a reused cleaner by employing a cleaner body constructed of tough elastic material which will not function as a culture medium for molds, fungi or bacteria.

Other objects and numerous advantages of the invention will appear upon perusal of the following description illustrated by the accompanying drawings, of which:

Fig. I is an isometric view of a pipe line cleaner employed in practicing the invention;

Fig. II is an isometric view showing the pipe line cleaner entering a tube having an interior diameter much smaller than the exterior diameter of the uncompressed pipe line cleaner;

Fig. III is an isometric view of a straight length of pipe line with a piece broken out to show the pipe cleaner therewithin;

Fig. IV is a fragmentary sectional view showing the pipe line cleaner passing through an elbow bend;

Fig. V is a fragmentary sectional view showing the tip of a rotatable cutter which may be used in one method of making the pipe line cleaner; and Fig. VI is an isometric view showing the manner in which such rotatable cutter is used.

This specification and the accompanying drawings are intended to describe and illustrate the invention but not to impose limitations on its scope.

The pipe line cleaner is usable for cleaning pipe lines which are conduits for many kinds of liquids. It is often important that a pipe line that is used to convey successively liquids having different chemical compositions or other characteristics be cleaned between runs of such different liquids to prevent contamination of liquids of succeeding runs by residues of preceding runs. Frequent and thorough cleaning is necessary where pipe lines are used to convey liquids that are liable to spoilage. The pipe lines of the milking machines, for example, should be thoroughly cleaned after each use.

A pipe line cleaner employed in the practice of applicant's invention consists of a compressible cylindrical body 1 having a diameter which exceeds the inside diameter of the piping in which cleaner is to be used preferably by about 70 percent, for example, cleaners having diameters when uncompressed ranging from 2⅛ inches to 2⅝ inches are effectively usable in piping having an inside diameter of 1½ inches.

The cylindrical body 1 comprises a porous or cellular structure of tough elastic sponge, voids in which constitute 90 percent, more or less, of the volume of the cylindrical body.

The squeezing, rubbing and strains to which the cleaner is subjected as it is propelled through the conduits with their bends, elbows and T where it alternately takes up and expels liquid, and the subsequent washing and drying are severely abusive. In previous experiments with swab type cleaners that soon deteriorated and wadded or shredded or crumbled. The applicant has discovered that such rapid deterioration can be avoided by utilizing a material that not only is immune to deleterious effects of fats, oils and other chemical constituents of liquids that are conveyed by pipe lines, does not swell in water and is not attacked by detergents but which also retains its elasticity when subjected to severe distortion and furthermore is resistant to wear. Specifically he has discovered that polyurethane in the form of polymerized foam possesses the unobvious potentiality of such material for utilization in the pipe line cleaner of his invention. Polyurethane has the further advantageous characteristic that it does not support growths of mold, fungi or bacteria.

Incorporated with the compressible resilient structure of the cylindrical body 1 is a transverse impervious membrane 2 preferably of the same flexible elastic material that is employed in the remainder of the cylindrical body and preferably located at the forward end of the cylindrical body.

The membrane 2 may be formed on the surface of the foam before polymerization. When thus formed it is integral with and partakes of all deformations of the adjacent porous structure. The face of the impervious membrane wrinkles under radial compression but its edge conforms closely to the inner surfaces of piping through which the cleaner is passed. Alternatively the impervious membrane can be incorporated after polymerization of the porous structure either by applying to the surface of the porous structure a polymerizable coating or by attaching polymerized film by means of an adhesive. In any case the membrane may be formed or applied before or after the porous body is given its cylindrical shape.

Preferably the cylindrical body is given its cylindrical shape by cutting it in the manner shown in Fig. VI from a block or loaf 3 of polymerized porous material having an impervious skin 4 on its surface. A tool 5 suitable for cutting the cylindrical bodies is shown in Figs. V and VI. The tool 5 during the cutting operation is rotated at high speed while at descends so that its circular edge 6 slices through the skin 4 and porous structure of the block 3.

When the cylindrical body is thus cut from a block or loaf, or is machined into shape in any other manner, its exterior surface is a brush of short resilient bristle-like tips, the abrasive action of which scours the interiors of piping through which the cleaner passes.

In using the pipe line cleaner to clean the pipe line of a milking machine the cleaner is inserted with the impervious membrane 2 foremost at an end of the pipe remote from the point at which the vacuum pump of the milking apparatus is attached to the pipe line. As a vacuum is created ahead of the cleaner it travels rapidly through the pipe line taking the residue of milk with it. This residue of milk is uncontaminated and can be added to the milk previously discharged by the machine. The pipe line then may be washed with a cleaning solution and flushed out by water. After the line is flushed out another pipe line cleaner can be sucked through the line thus cleaning out residual water.

Because the differential between the partial vacuum and atmospheric pressure occurs at the impervious membrane the propulsive force is applied preponderantly to the membrane which draws the porous body after it. The porous body thus scrubs out the tube with no tendency to wad and clog the tubing or fittings as it would be liable to do if it were pushed by pressure from behind.

In tests of the pipe line cleaners according to the above described invention one of the said pipe line cleaners was drawn through the pipe line of a milking machine with a vacuum approximating 28 inches of mercury four times daily for eighty days thus traveling at high speed through the pipe line an estimated distance of about one hundred and fifty thousand feet leaving the interior of the line bright and clean at each cycle, the pipe line cleaner itself remaining usable during the entire period.

The device and the manner of making and using it hereinabove described are exemplary only and it is to be understood that the invention includes use of modifications within the spirit and scope of the subjoined claims.

I claim:

1. The method of cleaning a pipe line of a given essentially uniform cross section comprising the steps of developing a pressure gradient along said pipe-line interior and introducing a cylinder into the high pressure end of the pipe line, said cylinder having a length along its axis greater than any transverse dimension, said cylinder having been cut from a body of porous resilient material with a cross section generally conforming to and larger than said given cross section and having a relatively non-porous membrane extending across its cross section at one end to bar the flow of fluid axially therethrough, the cylinder being so oriented upon introduction into the pipe line that its axis is parallel to the axis of said pipe line and its membrane bearing end is ahead of its major body portion.

2. The method of cleaning a pipe line of a given essentially uniform cross section comprising the steps of developing a pressure gradient along said pipe line, introducing a cylindrical body having a length in excess of any dimension across its cross section and a relatively non-porous membrane integral with one end and extending thereacross into the high pressure end of the pipe line with said membrane bearing end ahead of its major body portion, said cylinder having been cut from a body of polyurethane so as to leave sharp broken cells on its outer surface, and propelling said cylinder along said pipe line by said pressure gradient to scour the pipe line walls with said sharp broken cells.

3. The method of cleaning a pipe line of a given essentially uniform cross section comprising the steps of developing a pressure gradient in the pipe line and introducing into the high pressure end of the pipe line, a cylindrical body of porous resilient material generally conforming to the given cross section having a length in excess of any dimension across its cross section and having a pliant transverse relatively non-porous membrane extending across the leading face of said cylinder within said pipe line to form a barrier to the flow of fluid axially through said cylinder.

References Cited in the file of this patent

UNITED STATES PATENTS

| | | |
|---|---|---|
| 1,325,348 | Bowman | Dec. 16, 1919 |
| 1,553,775 | Hertz | Sept. 15, 1925 |
| 1,683,429 | Walker | Sept. 4, 1928 |
| 1,989,201 | Kurtz et al. | Jan. 29, 1935 |
| 2,413,626 | Hedges | Dec. 31, 1946 |

FOREIGN PATENTS

| | | |
|---|---|---|
| 293,032 | Great Britain | Nov. 29, 1928 |
| 716,422 | Great Britain | Oct. 6, 1954 |

OTHER REFERENCES

Modern Plastics, vol. 32, No. 12 (August 1955), pp. 102–104.